US011415790B2

(12) United States Patent
Newberg

(10) Patent No.: US 11,415,790 B2
(45) Date of Patent: *Aug. 16, 2022

(54) FIXED REFERENCE EDGE SYSTEM FOR SLIDE LOADING AND UNLOADING

(71) Applicant: LEICA BIOSYSTEMS IMAGING, INC., Vista, CA (US)

(72) Inventor: Nicholas Newberg, San Marcos, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,353

(22) Filed: Feb. 5, 2021

(65) Prior Publication Data
US 2021/0165203 A1 Jun. 3, 2021

Related U.S. Application Data

(63) Continuation of application No. 16/624,042, filed as application No. PCT/US2018/063465 on Nov. 30, 2018, now Pat. No. 10,942,347.

(Continued)

(51) Int. Cl.
*G02B 21/26* (2006.01)
*G01N 1/02* (2006.01)
(Continued)

(52) U.S. Cl.
CPC ........... *G02B 21/26* (2013.01); *B65G 49/062* (2013.01); *G01N 1/02* (2013.01); *G01N 35/00029* (2013.01); *G02B 21/36* (2013.01)

(58) Field of Classification Search
CPC ...... B65G 49/062; B65G 49/068; G01N 1/02; G01N 2035/00039; G01N 2035/00089;
(Continued)

(56) References Cited

U.S. PATENT DOCUMENTS 3,738,730 A   6/1973 Binnings et al.
4,248,498 A * 2/1981 Georges ................. G02B 21/26
                                                          356/244

(Continued)

FOREIGN PATENT DOCUMENTS

AU    2018374383 B2    10/2021
CN       1040442 A       3/1990
(Continued)

OTHER PUBLICATIONS

Office Action in Australian Application No. 2018374383 dated Apr. 23, 2021 in 3 pages.

(Continued)

*Primary Examiner* — Negussie Worku
(74) *Attorney, Agent, or Firm* — Knobbe, Martens, Olson & Bear, LLP

(57) ABSTRACT

A fixed reference edge system that guides a glass slide from a slot of a slide rack onto a scanning stage and guides the glass slide from the scanning stage into the slot of the slide rack. In an embodiment, the fixed reference edge has a first side that is parallel to a side of the slot of the slide rack. The system comprises an assembly that includes a push bar configured to push the slide from the slot onto the scanning stage, and a pull bar configured to pull the slide from the scanning stage into the slot of the slide rack. When the slide is pulled into the slide rack, the long edge of the slide is pressed against the first side of the fixed reference edge to maintain a parallel orientation between the slide and the slot of the slide rack.

20 Claims, 3 Drawing Sheets

Related U.S. Application Data

(60) Provisional application No. 62/593,448, filed on Dec. 1, 2017.

(51) Int. Cl.
*G02B 21/36* (2006.01)
*B65G 49/06* (2006.01)
*G01N 35/00* (2006.01)

(58) Field of Classification Search
CPC ... G01N 2035/00138; G01N 35/00029; G02B 21/082; G02B 21/26; G02B 21/34; G02B 21/36; G02B 21/362
USPC .......................................................... 358/474
See application file for complete search history.

(56) References Cited

U.S. PATENT DOCUMENTS

| | | | |
|---|---|---|---|
| 4,367,915 A | 1/1983 | Georges | |
| 5,367,401 A | 11/1994 | Saulietis | |
| 5,612,819 A * | 3/1997 | Meyer | G02B 21/34 356/244 |
| 5,659,421 A * | 8/1997 | Rahmel | G02B 21/26 359/391 |
| 6,395,554 B1 | 5/2002 | Regan et al. | |
| 6,847,481 B1 * | 1/2005 | Ludl | G01N 35/04 359/368 |
| 7,753,457 B2 | 7/2010 | Wood | |
| 8,902,501 B2 | 12/2014 | Suzuki et al. | |
| 10,942,347 B2 * | 3/2021 | Newberg | G02B 21/36 |
| 2008/0187464 A1 | 8/2008 | Guo et al. | |
| 2010/0139338 A1 | 6/2010 | Wintersteiger | |
| 2012/0002276 A1 | 1/2012 | Suzuki et al. | |
| 2012/0189412 A1 | 7/2012 | Hoffmann et al. | |
| 2014/0313314 A1 * | 10/2014 | Crandall | H04N 5/2256 348/79 |
| 2014/0362436 A1 * | 12/2014 | Forget | G01N 1/312 359/391 |
| 2015/0092265 A1 | 4/2015 | Yamashita | |
| 2019/0101555 A1 * | 4/2019 | Newberg | G02B 21/26 |
| 2021/0055317 A1 * | 2/2021 | Newberg | G01N 35/00029 |

FOREIGN PATENT DOCUMENTS

| | | | |
|---|---|---|---|
| CN | 1042995 A | 6/1990 | |
| CN | 1217476 A | 5/1999 | |
| CN | 1373900 A | 10/2002 | |
| CN | 101715564 A | 5/2010 | |
| CN | 102313978 A | 1/2012 | |
| CN | 102607921 A | 7/2012 | |
| CN | 103033408 A | 4/2013 | |
| CN | 203350526 U | 12/2013 | |
| CN | 104505353 A | 4/2015 | |
| CN | 106019607 A | 10/2016 | |
| CN | 205844612 U | 12/2016 | |
| CN | 106415356 A | 2/2017 | |
| CN | 106885709 A | 6/2017 | |
| CN | 206224042 U | 6/2017 | |
| CN | 111183387 A | 5/2020 | |
| CN | 111406218 A | 7/2020 | |
| DE | 4019859 A1 | 1/1992 | |
| EP | 2993510 A1 | 3/2016 | |
| EP | 3009873 A1 | 4/2016 | |
| JP | S60-49314 U | 4/1985 | |
| JP | 2020-537173 A | 12/2020 | |
| JP | 2021-512347 A | 5/2021 | |
| WO | WO 03/038504 A1 | 5/2003 | |
| WO | WO 2009/109298 A1 | 9/2009 | |
| WO | WO 2013/170366 A2 | 11/2013 | |
| WO | WO 2016/199064 A1 | 12/2016 | |
| WO | WO 2019/071040 A1 | 4/2019 | |
| WO | WO 2019/109032 A1 | 6/2019 | |

OTHER PUBLICATIONS

Extended European Search Report dated Mar. 22, 2021 for related European Patent Application No. 18883631.6 in 7 pages.
International Search Report and Written Opinion dated Feb. 8, 2019 for App No. PCT/US2018/063465, in 7 pages.
International Preliminary Report on Patentability for related International Application No. PCT/US2018/063465, dated Sep. 23, 2019, in 9 pages.
First Office Action in Chinese Application No. 201880064836.4 dated Jul. 15, 2021, in 18 pages.
Extended European Search Report for EP 18864073.4 dated Jan. 29, 2021 in 9 pages.
International Search Report and Written Opinion dated Dec. 6, 2018 for related International App No. PCT/US18/54460, in 10 pages.
International Preliminary Report on Patentability dated Mar. 12, 2020 for related International App No. PCT/US18/54460, in 11 pages.
Notice of Allowance in Australian Application No. 2018374383 dated Oct. 5, 2021, in 3 pages.

* cited by examiner

FIXED REFERENCE EDGE SYSTEM FOR SLIDE LOADING AND UNLOADING

CROSS-REFERENCE TO RELATED APPLICATIONS

This application is a continuation of U.S. patent application Ser. No. 16/624,042, filed on Dec. 18, 2019, which is a national stage entry of International Patent App. No. PCT/US2018/063465, filed on Nov. 30, 2018, which claims priority to U.S. Provisional Patent App. No. 62/593,448, filed on Dec. 1, 2017, which are all hereby incorporated herein by reference as if set forth in full.

BACKGROUND

Field of the Invention

The present invention relates generally to a digital slide scanning apparatus (e.g., for pathology) and, more particularly, to a fixed reference edge that is positioned to guide a glass slide being loaded from a slide rack onto a scanning stage or being unloaded from the scanning stage into the slide rack.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Glass slides that are processed by a digital slide scanning apparatus are very fragile and highly valuable. Unfortunately, conventional digital slide scanners tend to damage glass slides when the glass slides are conveyed from a slide rack onto the scanning stage or conveyed from the scanning stage into the slide rack. Therefore, what is needed is a system and method that overcomes these significant problems found in the conventional systems described above.

SUMMARY

Accordingly, a fixed reference edge system is described herein that guides a glass slide being loaded from a slide rack onto the scanning stage and also guides the glass slide being unloaded from the scanning stage back into the slide rack. The system includes a fixed reference edge that has a first side that is parallel to a side of the slot of the slide rack from which the slide was unloaded. The system also includes a push/pull assembly that includes a push bar that is configured to push the glass slide out of the slot of the slide rack directly onto the scanning stage such that a long edge of the glass slide is adjacent the first side of the fixed reference edge. The push/pull assembly also includes a pull bar that is configured to pull the glass slide from the scanning stage into the slot of the slide rack. When the glass slide is pulled into the slot of the slide rack, the long edge of the glass slide is pressed against the first side of the fixed reference edge to position the long edge of the glass slide parallel to the side of the slot of the slide rack for insertion into the slot of the slide rack without damaging the glass slide.

In an embodiment, a digital slide scanning apparatus is disclosed that comprises: a stage comprising a recessed slot within which a glass slide rests during scanning, and a reference edge positioned to form a long edge of the recessed slot; and an assembly configured to push a glass slide out of a slide rack directly into the recessed slot on the stage, and pull a glass slide from the recessed slot on the stage directly into the slide rack, wherein the reference edge prevents yaw rotation of a glass slide as the glass slide is pulled into the slide rack by the assembly. The reference edge may extend along an entire long edge of a glass slide when the glass slide is positioned in the recessed slot on the stage.

In an embodiment, the recessed slot comprises a through hole configured to allow illumination of the glass slide from below during scanning. The recessed slot may comprise at least two support surfaces on opposing sides of the through hole, wherein the at least two support surfaces are configured to support at least two opposing edges of a glass slide when the glass slide is positioned in the recessed slot on the stage. The reference edge may be positioned on a portion of one of the at least two support surfaces.

In an embodiment, the stage further comprises one or more finger grooves configured to expose one or more portions of opposing short edges of a glass slide when the glass slide is positioned in the recessed slot on the stage. The assembly may comprise a pull bar and a push bar, wherein the pull bar is configured to pull a glass slide from the recessed slot on the stage directly into the slide rack, and wherein the push bar is configured to push a glass slide out of a slide rack directly into the recessed slot on the stage. The pull bar may comprise at least one pull finger configured to engage a short edge of a glass slide, via the one or more finger grooves, when the glass slide is positioned in the recessed slot on the stage, and pull the glass slide from the recessed slot on the stage directly into the slide rack by sliding within the one or more finger grooves. The at least one pull finger may be configured to lower down to engage the short edge of a glass slide, and raise up to disengage the short edge of a glass slide. For example, the at least one pull finger may be configured to lower down and raise up by rotating around a longitudinal axis of the pull bar, wherein the digital slide scanning apparatus further comprises at least one processor configured to control the rotation of the pull finger. The push bar may comprise at least one push finger configured to engage a short edge of a glass slide when the glass slide is in the slide rack, and push the glass slide from the slide rack directly into the recessed slot on the stage. In an embodiment, the assembly further comprises an opening between the push bar and the pull bar, wherein the opening is configured to allow the slide rack to pass through.

The digital slide scanning apparatus may further comprise at least one processor configured to control at least one motor to move the assembly in two directions along a linear axis that is parallel with a longitudinal axis of the recessed slot on the stage and a longitudinal axis of a slot in the slide rack. The stage may further comprise a spring arm configured to press a long edge of a glass slide towards the reference edge so as to prevent the yaw rotation of the glass slide. The digital slide scanning apparatus may further comprise at least one processor that, while a glass slide is pulled from the stage into the slide rack, controls the spring arm to press the long edge of the glass slide towards the reference edge to prevent the yaw rotation of the glass slide.

In an embodiment, a method is disclosed that comprises: controlling a motor to drive an assembly to push a first glass slide from a slot of a slide rack directly onto a scanning stage of a digital slide scanning apparatus, so as to position a long edge of the glass slide adjacent to a side of a reference edge on the scanning stage, wherein the side of the reference edge is parallel to a side of the slot of the slide rack; controlling the digital slide scanning apparatus to scan the glass slide; and, subsequent to scanning the glass slide, controlling the motor to drive the assembly to pull the glass slide from the scanning stage into the slot of the slide rack, wherein the side of the reference edge prevents yaw rotation of the glass slide while the glass slide is pulled into the slot of the slide rack. The method may further comprise, while the glass slide is pulled into the slot of the slide rack, controlling a spring arm on the scanning stage to press the long edge of the glass slide towards the side of the reference edge to prevent the yaw rotation of the glass slide.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a fixed reference edge to facilitate slide loading from a slide rack onto a scanning stage and slide unloading from the scanning stage into a slot of the slide rack. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Push/Pull Assembly

Figure 1A:
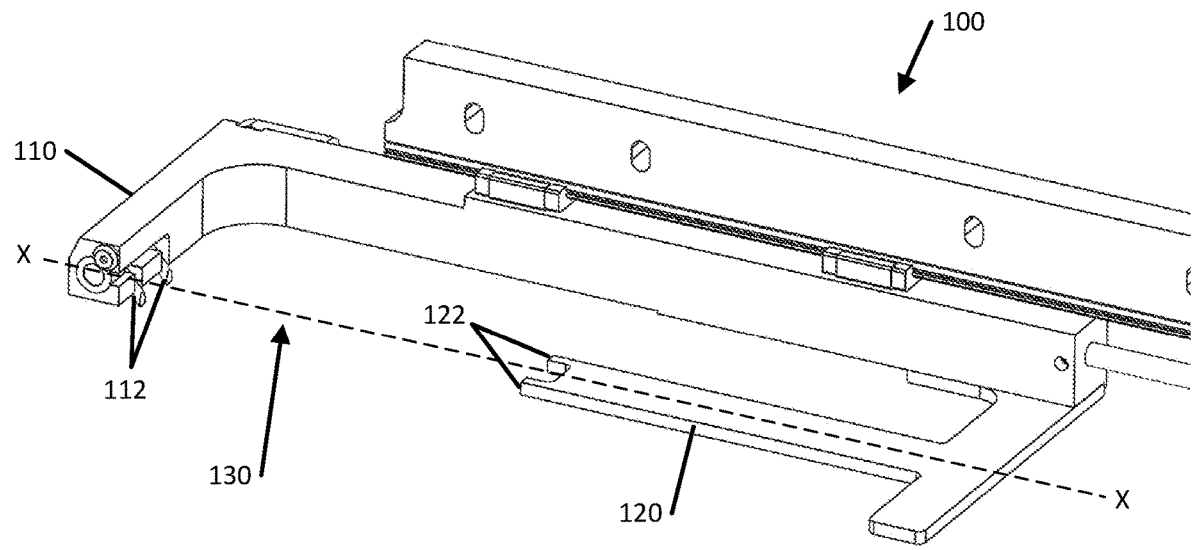
FIG. 1A is a perspective-view diagram illustrating an example push/pull assembly of a digital slide scanning apparatus, according to an embodiment.

FIG. 1A is a perspective-view diagram illustrating an example push/pull assembly 100 of a digital slide scanning apparatus, according to an embodiment. In the illustrated embodiment, the push/pull assembly 100 includes a pull bar 110 comprising one or more pull fingers 112 extending from a surface of the pull bar 110. The push/pull assembly 100 also includes a push bar 120 comprising one or more push fingers 122 extending from a surface of the push bar 120. In the illustrated embodiment, there are two pull fingers 112 and two push fingers 122. However, in alternative embodiments, there may be fewer pull fingers 112 and/or push fingers 122 (e.g., one) or more pull fingers 112 and/or push fingers 122 (e.g., three, four, five, etc.). In addition, the number of pull fingers 112 may be the same as the number of push fingers 122 or different (e.g., fewer or more) than the number of push fingers 122.

In an embodiment, the pull fingers 112 are configured to raise up to bring the fingers 112 out of contact with an edge of a glass slide 585, and to lower down to bring the fingers 112 into contact with the edge of the glass slide 585. For example, the pull fingers 112 may rotate up and down within a rotational range around the longitudinal axis of the pull bar 110. In contrast, the push fingers 122 may be positionally fixed.

In an embodiment, the one or more pull fingers 112 and the one or more push fingers 122 are positioned along the same linear axis X-X and spaced apart by an opening 130 between the ends of the pull fingers 112 and the ends of the push fingers 122. The width of the opening 130, orthogonal to the linear axis X-X, may be at least as wide as the short edge of a glass slide 585, and the length of the opening 130, along the linear axis X-X, may be at least as long as the long edge of the glass slide 585. In an embodiment, the push/pull assembly 100 is substantially in the shape of a letter "C" with a slide rack opening 130 that is configured to allow at least a portion of a slide rack 300, as well as slides 585 within the slide rack 300, to be positioned between the pull fingers 112 and the push fingers 122, with the pull fingers 112 and the push fingers 122 oriented within the width of the short edge of a glass slide 585 stored in the slide rack 300.

Figure 1B:
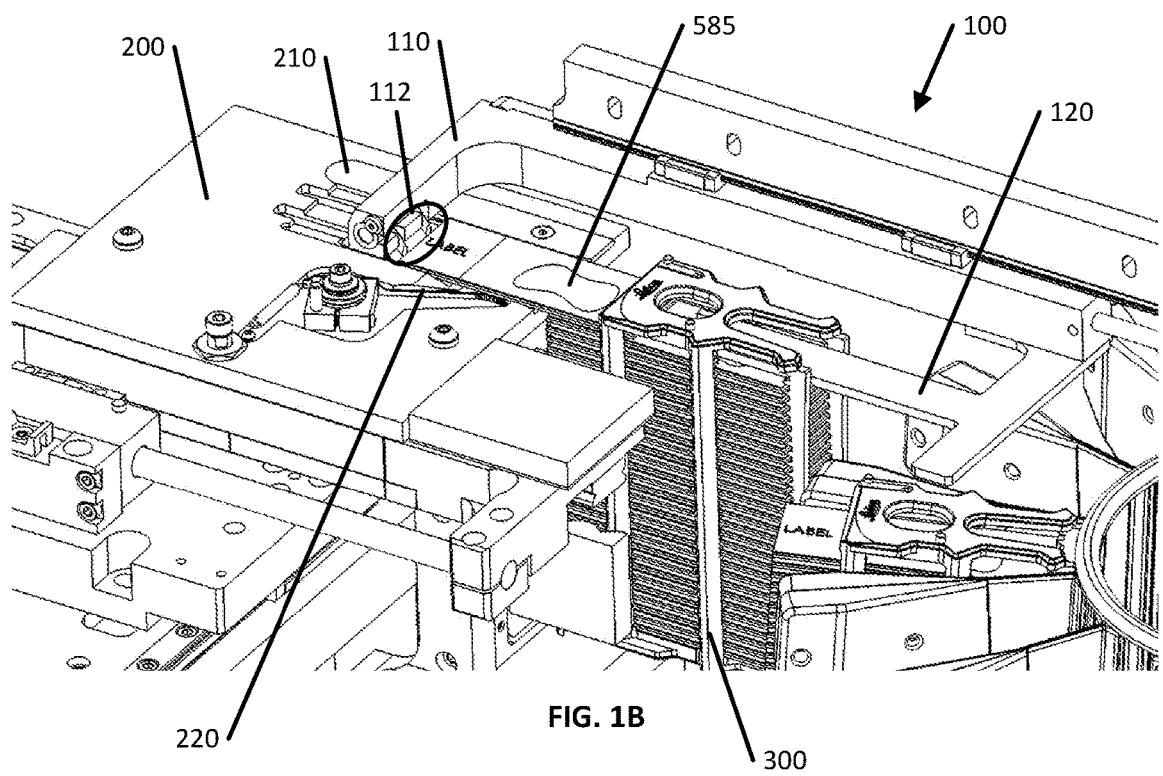
FIG. 1B is a perspective-view diagram illustrating an example push/pull assembly, slide rack, and scanning stage of a digital slide scanning apparatus, according to an embodiment.

FIG. 1B is a perspective-view diagram illustrating an example push/pull assembly 100, in combination with a scanning stage 200 and a slide rack 300, in operation within a digital slide scanning apparatus, according to an embodiment. In the illustrated operation, the push bar 120 of the push/pull assembly 100 is extended into the slide rack 300. The push/pull assembly 100 may either be loading a glass slide 585 from a slot of the slide rack 300 onto the scanning stage 200 or unloading the glass slide 585 from the scanning stage 200 into the slot in the slide rack 300.

2. Example Scanning Stage

The scanning stage 200 comprises a through hole 240 to allow illumination during scanning. The through hole has support surfaces along its perimeter that define a slot into which a glass slide 585 is inserted and by which the glass slide 585 is supported above the through hole. In an embodiment, the scanning stage 200 also comprises a reference edge 210 that is positioned on one of the support surfaces, such that a first side of the reference edge 210 is parallel to a side of the slot in the slide rack 200 into which the glass slide 585 is inserted. A spring arm 220 is attached to a top surface of the scanning stage 200 and configured to press the glass slide 585 against the first side of the reference edge 210, in order to maintain a parallel orientation between the long edge of the glass slide 585, that is pressed against the first side of the reference edge 210, and the side of the slot in the slide rack into which the glass slide 585 is inserted. Advantageously, this prevents yaw rotation (i.e., rotation around an axis orthogonal to the plane of the scanning stage 200), at least when unloading the glass slide 585 from the scanning stage 200 into the slide rack 300.

Figure 2A:
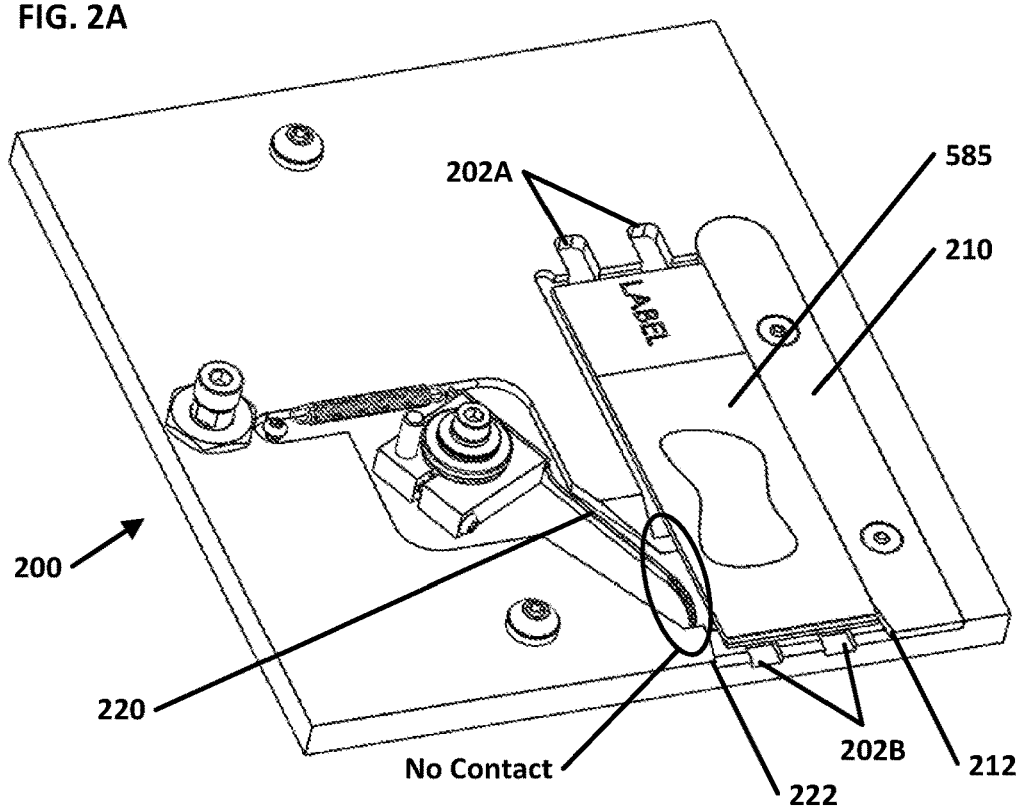
FIG. 2A is a perspective-view diagram illustrating an example scanning stage with reference edge and glass slide, according to an embodiment.

FIG. 2A is a perspective-view diagram illustrating an example scanning stage 200 with a reference edge 210 and a glass slide 585, according to an embodiment. In the illustrated embodiment, the scanning stage 200 comprises a reference edge 210 positioned with a first side that is adjacent a long edge of the glass slide 585 positioned on the scanning stage 200 for scanning. The scanning stage 200 also comprises a spring arm 220 configured to press the glass slide 585 against the first side of the reference edge 210. As illustrated, in an embodiment, there is no contact between the spring arm 220 and the glass slide 585 when the glass slide 585 is being loaded onto the scanning stage 200. For example, as the glass slide 585 is being loaded onto the scanning stage 200, a processor 555 of the digital slide scanning apparatus may control the spring arm 220 to move away from the edge 222 of the slot into which the glass slide 585 is inserted so as to avoid contacting the glass slide 585 or at least avoid applying pressure to the glass slide 585.

In an embodiment, the scanning stage 200 comprises one or more finger grooves 202 formed as recesses into the top surface of the scanning stage 200 and extending into the recessed slot into which the glass slide 585 is inserted for scanning. The finger grooves 202 may logically extend along an entire longitudinal length of the slot of the scanning stage 200 into which the slide 585 is inserted, but may be separated into two sections 202A and 202B by the through hole 240 in the scanning stage 200. The finger grooves 202 are configured to receive both the pull fingers 112 and the push fingers 122 for unloading and loading. For example, the pull fingers 112 of the pull bar 110 of the push/pull assembly 100 may lower down into the finger grooves 202A to engage a first short edge of the glass slide 585, positioned on the scanning stage 200, and slide along the finger grooves 202 so that the push/pull assembly 100 can pull the glass slide 585 fully off of the scanning stage 200 and into the slide rack 300. In addition, the push fingers 122 may engage a second short edge, opposite the first short edge, of a glass slide 585, within the slide rack 300, to push the glass slide 585 onto the scanning stage 200 when the slide 585 is being loaded onto the scanning stage 200. While pushing the glass slide 585 onto the scanning stage 200, the push fingers 122 may slide into the finger grooves 202B of the scanning stage 200 to fully push the slide 585 into the insertion slot of the scanning stage 200.

In an embodiment, the edges 212 and 222 defining the recessed slot, into which the glass slide 585 is inserted, may be beveled to facilitate more reliable loading of the glass slide 585 from the slide rack 300 onto the scanning stage 200. For example, in the illustrated embodiment, the recessed slot, into which the glass slide 585 is loaded onto the scanning stage 200, has at least three sides. One of the three sides is formed by the reference edge 210. Advantageously, all three sides of the recessed slot may be beveled, including the edges formed by the scanning stage 200 and the edge formed by the reference edge 210. Alternatively, all three sides may be unbeveled or only some of the three sides may be beveled.

Figure 2B:
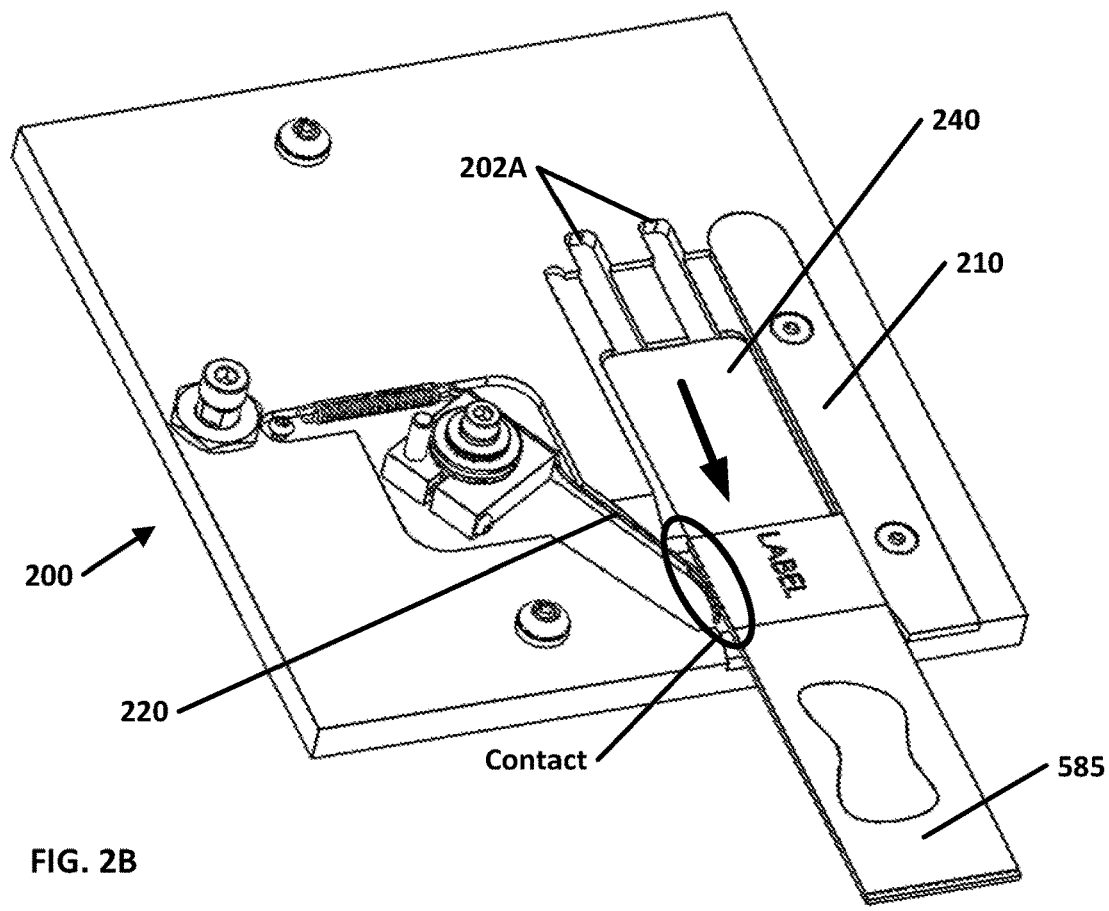
FIG. 2B is a perspective-view diagram illustrating an example scanning stage with reference edge and glass slide, according to an embodiment.

FIG. 2B is a perspective-view diagram illustrating an example scanning stage 200 with a reference edge 210 and a glass slide 585, according to an embodiment. In the illustrated embodiment, as the glass slide 585 is being unloaded from the scanning stage 200 into the slide rack 300, the spring arm 220 applies positive pressure to the long edge of the glass slide 585. For example, as the glass slide 585 is being unloaded from the scanning stage 200, a processor 555 of the digital slide scanning apparatus may control the spring arm 220 to move toward the edge 222 of the slot into which the glass slide 585 is inserted, so as to contact and apply pressure to the glass slide 585. The pressure, applied by the spring arm 220 to one long edge of the glass slide 585, also presses the other long edge of the glass slide 585 against the reference edge 210, so as to prevent yaw rotation.

In the illustrated embodiment, the scanning stage 200 also includes a through hole 240, configured to allow the glass slide 585 to be illuminated from below during scanning. There are one or more support surfaces along a perimeter of the through hole 240. The support surfaces are parallel to a top surface of the scanning stage 200, but recessed below the top surface of the scanning stage 200 to form a recessed insertion slot for slides 585. In an embodiment, the depth of the recessed slot may be less than the thickness of a conventional glass slide 585. In an embodiment, the spring arm 220 is similarly recessed below the top surface of the scanning stage 200 to allow the spring arm 220 to contact an edge of the glass slide 585.

3. Example Embodiments

In an embodiment, a digital slide scanning apparatus includes a stage upon which a glass slide is positioned for scanning, the stage comprising a reference edge positioned adjacent the long edge of the glass slide when the glass slide is positioned on the stage for scanning. The digital slide scanning device also includes a push/pull assembly configured to push a slide out of a slide rack directly onto the stage, the push/pull assembly further configured to pull a slide from the stage directly back into the slide rack, where the reference edge prevents yaw rotation of the glass slide as the slide is pulled back into the slide rack.

In an embodiment, the reference edge extends along the entire long edge of the glass slide when the glass slide is positioned on the stage for scanning. The stage may also include a through hole configured to allow illumination of the glass slide during scanning, the through hole having at least two support surfaces parallel to a surface of the scanning stage, the at least two support surfaces configured to support at least two edges of the glass slide when the glass slide is positioned on the stage for scanning. In an embodiment, the reference edge is positioned on one of the at least two support surfaces of the through hole.

In an embodiment, the stage further comprises one or more finger grooves configured to allow access to a short edge of the glass slide when the glass slide is positioned on the stage for scanning.

In an embodiment, the push/pull assembly stage comprises a push bar and a pull bar, the push bar configured to push a slide out of a slide rack directly onto the stage for scanning and the pull bar configured to pull a glass slide from the stage directly back into the slide rack. In an embodiment, the push bar comprises at least one push finger configured to engage a short edge of the glass slide and push the glass slide from the slide rack directly onto the scanning stage. In an embodiment, the pull bar comprises at least one pull finger configured to engage the glass slide and pull the glass slide from the stage directly back into the slide rack. In an embodiment, the pull bar comprises at least one pull finger configured to extend into the one or more finger grooves to engage the glass slide and pull the glass slide from the stage directly back into the slide rack. In an embodiment, the push/pull assembly further comprises a slide rack opening between the push bar and the pull bar, the slide rack opening configured to allow a slide rack to pass through.

In an embodiment, a method of safely loading and unloading slides from a slide rack includes using a motor to drive a push/pull assembly to push a first glass slide from a first slot of a slide rack directly onto a scanning stage of a digital slide scanning device, wherein a long edge of the first glass slide is positioned on the scanning stage adjacent a first side of a reference edge, wherein the first side is parallel to a side of the first slot of the slide rack. The method also includes using the digital slide scanning device to scan the first glass slide and subsequent to scanning the first glass slide, using the motor to drive the push/pull assembly to pull the first glass slide from the scanning stage into the first slot of the slide rack, wherein the first side of the reference edge prevents yaw rotation of the first glass slide while the first glass slide is pulled into the first slot. In an embodiment, the method also includes pressing the long edge of the first glass slide against the first side of the reference edge to prevent yaw rotation of the first glass slide while the first glass slide is pulled into the first slot.

4. Example Digital Slide Scanning Apparatus

Figure 3A:
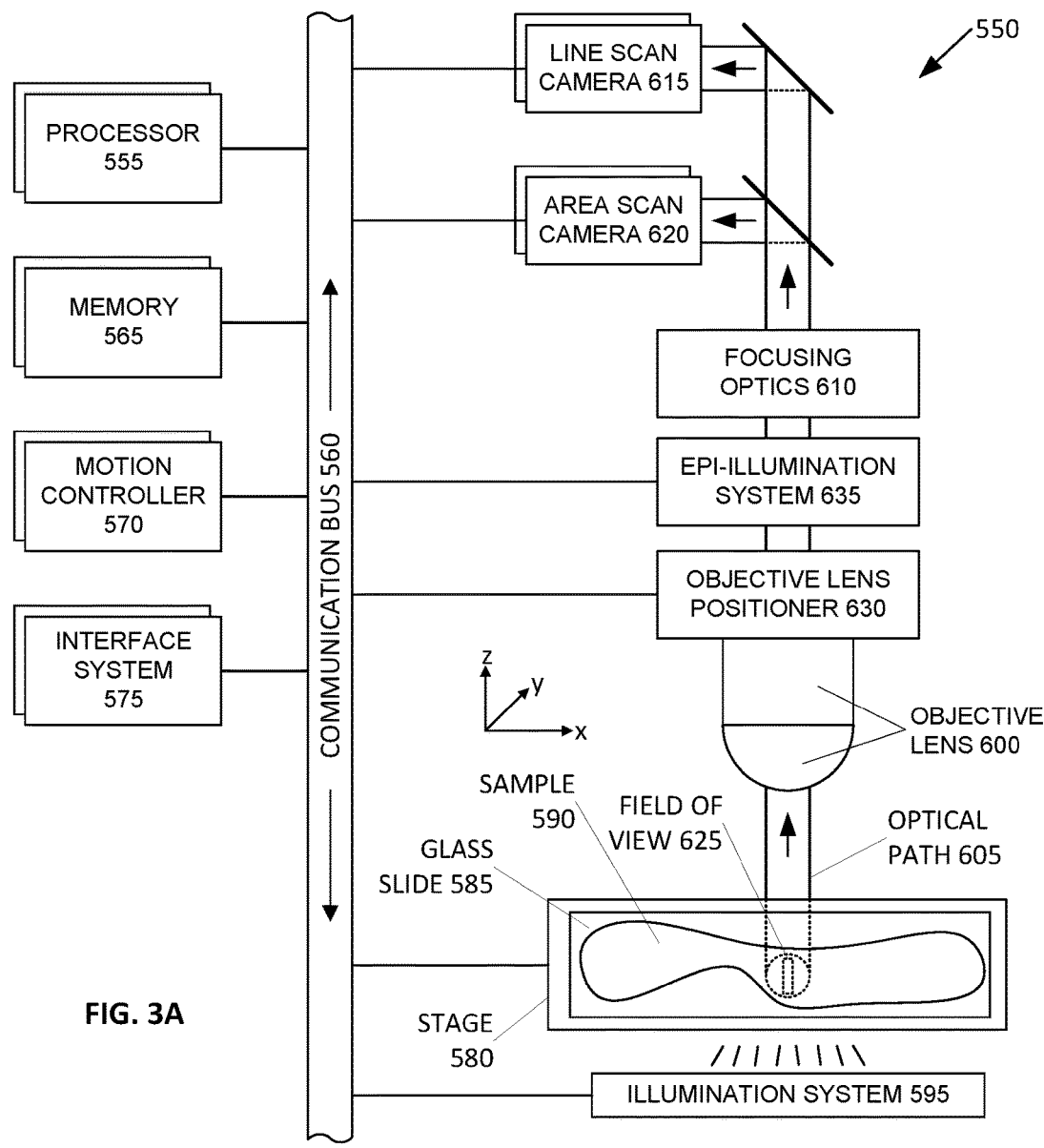
FIG. 3A is a block diagram illustrating an example processor-enabled device that may be used in connection with various embodiments described herein.

FIG. 3A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system, digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multi-core processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555. The one or more processors 555 may be configured to control the motor that drives the push/pull assembly 100, and further configured to control movement of the scanning stage 200 and the slide rack 300, to thereby control the overall workflow of the digital imaging device and the loading of glass slides 585 from the slide rack 300 onto the stage 200 and the unloading of glass slides 585 from the stage 200 into the slide rack 300.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X-Y-Z movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices, such as an image server system, an operator station, a user station, and an administrative server system, that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration (TDI) line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear motor based X-Y stage with high precision encoders employed on both the X and the Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA, or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X-Y-Z axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity-corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20X objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3-linear-array ("red-green-blue" or "RGB") color line scan camera or a 96-linear-array monochrome TDI may also be used. TDI line scan cameras typically provide a substantially better signal-to-noise ratio (SNR) in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1,024 pixels, and others having as many as 4,096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor, or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 3B:
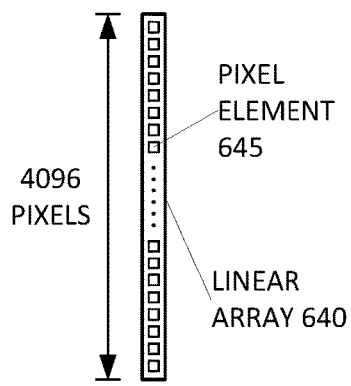
FIG. 3B is a block diagram illustrating an example line scan camera having a single linear array, according to an embodiment.

FIG. 3B illustrates a line scan camera having a single linear array 640, which may be implemented as a charge coupled device ("CCD") array. The single linear array 640 comprises a plurality of individual pixels 645. In the illustrated embodiment, the single linear array 640 has 4,096 pixels. In alternative embodiments, linear array 640 may have more or fewer pixels. For example, common formats of linear arrays include 512, 1,024, and 4,096 pixels. The pixels 645 are arranged in a linear fashion to define a field of view 625 for the linear array 640. The size of the field of view varies in accordance with the magnification of the scanner system 550.

Figure 3C:
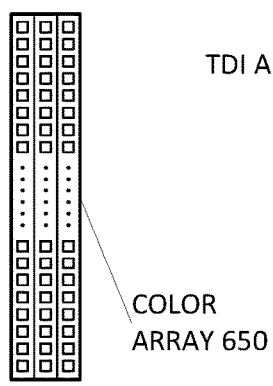
FIG. 3C is a block diagram illustrating an example line scan camera having three linear arrays, according to an embodiment.

FIG. 3C illustrates a line scan camera having three linear arrays, each of which may be implemented as a CCD array. The three linear arrays combine to form a color array 650. In an embodiment, each individual linear array in the color array 650 detects a different color intensity (e.g., red, green, or blue). The color image data from each individual linear array in the color array 650 is combined to form a single field of view 625 of color image data.

Figure 3D:
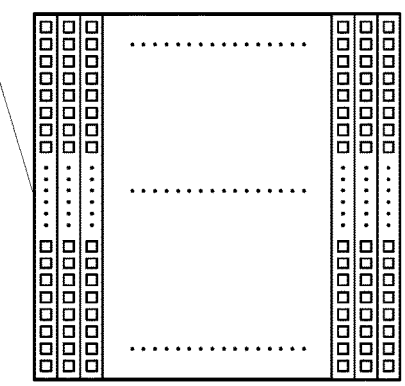
FIG. 3D is a block diagram illustrating an example line scan camera having a plurality of linear arrays, according to an embodiment.

FIG. 3D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square root of the number of linear arrays (also referred to as integration stages). A TDI line scan camera may comprise a larger variety of numbers of linear arrays. For example, common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus comprising:
   a stage comprising a recessed slot within which a glass slide rests during scanning, a reference edge positioned to form one edge of the recessed slot, and a spring arm configured to press one edge of the glass slide towards the reference edge;
   a push/pull assembly configured to push the glass slide out of a slide rack into the recessed slot on the stage, and pull the glass slide from the recessed slot on the stage into the slide rack; and
   at least one hardware processor configured to, while the glass slide is pulled from the recessed slot on the stage into the slide rack, control the spring arm to press the one edge of the glass slide towards the reference edge.

2. The digital slide scanning apparatus of claim 1, wherein the reference edge extends along an entire length of the one edge of the glass slide when the glass slide is positioned in the recessed slot on the stage.

3. The digital slide scanning apparatus of claim 1, wherein the recessed slot comprises a through hole configured to allow illumination of the glass slide from below during scanning.

4. The digital slide scanning apparatus of claim 3, wherein the recessed slot comprises at least two support surfaces on opposing sides of the through hole, and wherein the at least two support surfaces are configured to support at least two opposing edges of the glass slide when the glass slide is positioned in the recessed slot on the stage.

5. The digital slide scanning apparatus of claim 4, wherein the reference edge is positioned on a portion of one of the at least two support surfaces.

6. The digital slide scanning apparatus of claim 1, wherein the stage further comprises one or more finger grooves configured to expose one or more portions of opposing short edges of the glass slide when the glass slide is positioned in the recessed slot on the stage.

7. The digital slide scanning apparatus of claim 6, wherein the push/pull assembly comprises a push bar and a pull bar, wherein the push bar is configured to push the glass slide out of a slide rack into the recessed slot on the stage, and wherein the pull bar is configured to pull the glass slide from the recessed slot on the stage into the slide rack.

8. The digital slide scanning apparatus of claim 7, wherein the pull bar comprises at least one pull finger configured to engage a short edge of the glass slide, via the one or more finger grooves, when the glass slide is positioned in the recessed slot on the stage, and pull the glass slide from the recessed slot on the stage into the slide rack by sliding within the one or more finger grooves.

9. The digital slide scanning apparatus of claim 8, wherein the at least one pull finger is configured to lower down to engage the short edge of the glass slide, and raise up to disengage the short edge of the glass slide.

10. The digital slide scanning apparatus of claim 9, wherein the at least one pull finger is configured to lower down and raise up by rotating around an axis of the pull bar, and wherein the at least one processor is further configured to control the rotation of the pull finger.

11. The digital slide scanning apparatus of claim 10, wherein the axis is the longitudinal axis of the pull bar.

12. The digital slide scanning apparatus of claim 7, wherein the push bar comprises at least one push finger configured to engage a short edge of the glass slide when the glass slide is in the slide rack, and push the glass slide from the slide rack into the recessed slot on the stage.

13. The digital slide scanning apparatus of claim 12, wherein the at least one push finger is positionally fixed.

14. The digital slide scanning apparatus of claim 7, wherein the push/pull assembly further comprises an opening between the push bar and the pull bar, and wherein the opening is configured to allow the slide rack to pass through.

15. The digital slide scanning apparatus of claim 14, wherein the push bar comprises at least one push finger, wherein the pull bar comprises at least one pull finger, and wherein the opening is between the at least one push finger and the at least one pull finger.

16. The digital slide scanning apparatus of claim 15, wherein both the at least one push finger and the at least one pull finger are positioned along a linear axis of the opening.

17. The digital slide scanning apparatus of claim 1, wherein the push/pull assembly forms a C shape.

18. The digital slide scanning apparatus of claim 1, wherein the at least one processor is configured to control at least one motor to move the push/pull assembly in two directions along a linear axis that is parallel with a longitudinal axis of the recessed slot on the stage and a longitudinal axis of a slot in the slide rack.

19. A method comprising:
   driving a push/pull assembly to push a glass slide from a slot of a slide rack onto a scanning stage of a digital slide scanning apparatus, so as to position one edge of the glass slide adjacent to a side of a reference edge on the scanning stage, wherein the side of the reference edge is parallel to a side of the slot of the slide rack;
   scanning the glass slide;
   subsequent to scanning the glass slide, driving the push/pull assembly to pull the glass slide from the scanning stage into the slot of the slide rack; and,
   while the glass slide is pulled into the slot of the slide rack, pressing the one edge of the glass slide towards the side of the reference edge.

20. The method of claim 19, further comprising, while the glass slide is being pushed from the slot of the slide rack, controlling a spring arm on the scanning stage to move away from the glass slide so as to avoid contacting the glass slide.

* * * * *